Feb. 2, 1965
P. S. MUNN ETAL
3,168,614
ARMORED CABLE CONNECTION
Filed Jan. 16, 1962
2 Sheets-Sheet 1
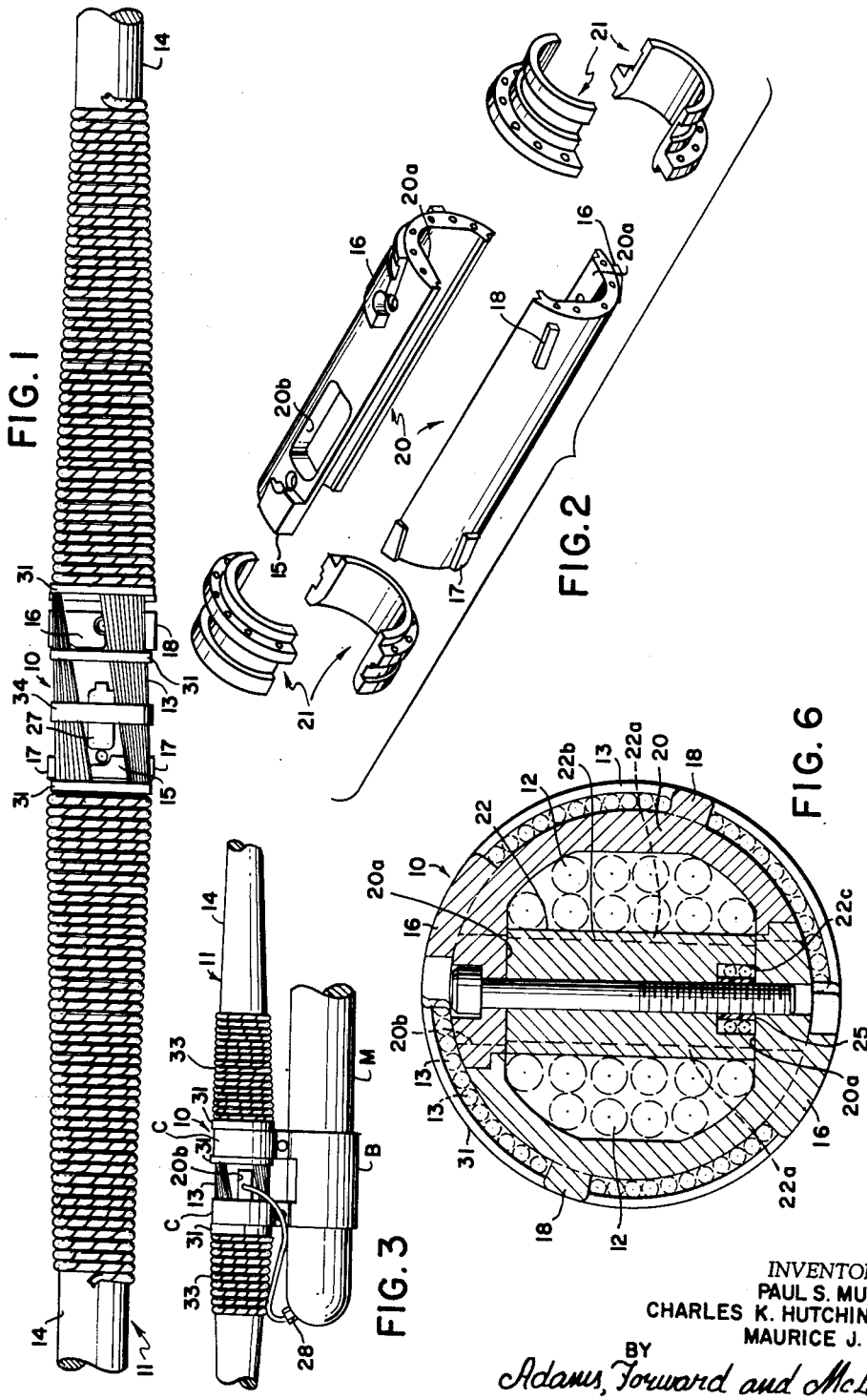
INVENTORS
PAUL S. MUNN
CHARLES K. HUTCHINS JR.
MAURICE J. ROSS
BY
Adams, Forward and McLean
ATTORNEYS

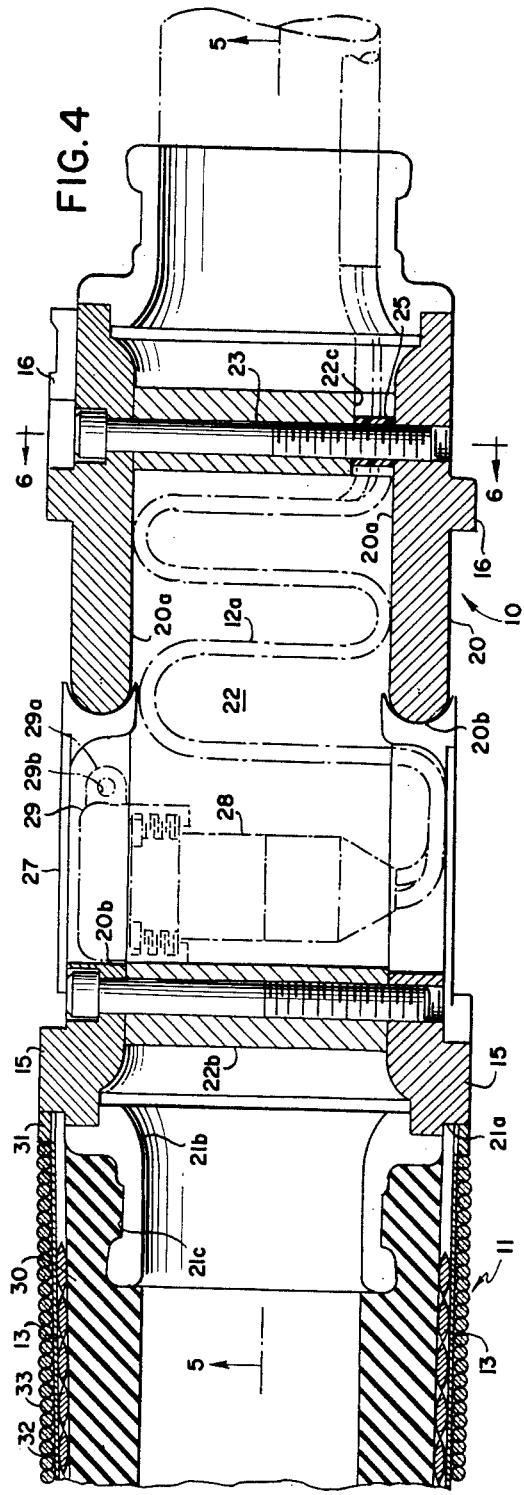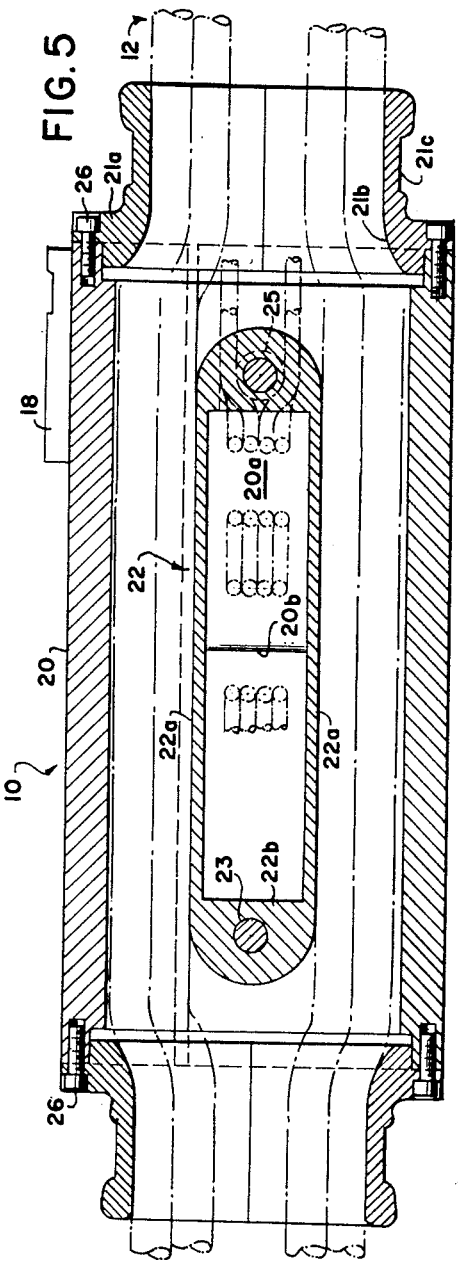

United States Patent Office 3,168,614
Patented Feb. 2, 1965

3,168,614
ARMORED CABLE CONNECTION
Paul S. Munn, Melrose, Mass., and Charles K. Hutchins, Jr., Greenland, and Maurice J. Ross, Summersworth, N.H., assignors to Simplex Wire and Cable Company
Filed Jan. 16, 1962, Ser. No. 166,719
4 Claims. (Cl. 174—70)

Our invention relates to electric cables and in particular provides a device for installation within an armored electric cable to enable external electrical connection with one or more of the conductors within the armored electric cable.

It is frequently desirable to make various types of scientific measurements using equipment located at intervals on the ocean floor. Such instruments are commonly electrical in nature, and are connected to, and installed with, a submarine cable system which is used to transmit the measurements as electrical signals to a receiving station. Conventionally, such equipment is spliced directly into the cable. However, where the equipment is massive, particularly in the instance of armored cable, it is at times desirable to provide a device within the cable which will permit rapid electrical connection of the equipment to the desired electrical conductor within the cable, and which will provide an area for rapid attachment of the equipment, as the cable is laid. Such attachment might be accomplished directly before the place of attachment enters the ocean. Prior to such attachment, such a device must not interfere with the passage of the cable through the laying machinery, such as sheaves, capstans, or the like. Also, the device must protect the conductor or conductors to be so attached from damage during such passage.

It is thus an important object of our invention to provide a device which can be installed in an armored cable as the cable is manufactured, and which will permit the attainment of such ends and which is of relatively simple construction. It is a further object of a preferred construction to provide such a device which can be so installed on the cable with a minimum amount of time and expense, without weakening the strength of the cable, and without the necessity of terminating or adding armor wires.

To these ends we provide a rigid, hollow housing having open ends which receives the various insulated conductors of an armored cable through its center and over which the armor wires are laid. The housing is further provided with a lateral aperture to permit access to its interior and a pair of bosses on its exterior aligned lengthwise with the aperture between them. The lengthwise alignment of the bosses and aperture preferably should be the same as the lay of the armor wires such that the armor wires passing over the housing are separated by the bosses without disturbing their lay to expose the aperture through which one or more of the conductors within the cable can be led out of the cable for external connection to such associated equipment as is desired.

In the preferred case the central portion of the housing is of larger interior cross-section than the ends of the housing and a hollow partition is disposed within the housing extending transversely between the sides of the housing and lengthwise through the enlarged center portion of the housing. The lateral aperture in the housing is positioned such that it opens into the hollow interior of the partition. In this manner a multi-conductor cable passing through the housing will have most of its conductors disposed on one or the other side of the partition while those conductors to which external connection is to be made extend within the hollow center of the partition from one end or the other. The conductor or conductors which extend within the partition preferably terminate in a connector of size and shape such that it will fit within the hollow partition. Thus when the cable is laid, as the portion of the cable containing the housing passes the payout sheave just prior to entry into the water, the connector can be extracted through the aperture and connected to the equipment to be externally associated with the cable when laid. The bosses on the exterior of the housing preferably project radially above the general external contour of the housing a distance which is greater than the diameter of the armor wires to provide surfaces suitable for receiving clamps or other fastening devices appropriately required for securing external equipment to the cable.

In the preferred case, the radial projection of the bosses above the armor wires is sufficient to allow the attachment to the ends of the bosses above the armor wires of rings encircling the armor wires. Such rings serve to retain the armor wires in position when the cable containing the housing is bent around a sheave under high tension such as occurs in cable laying.

For a more complete understanding of the practical application of our invention reference is made to the appended drawings in which:

FIGURE 1 is a side view of a section of armored submarine communication cable containing a device in accordance with our invention to permit external electrical connection with one or more of the conductors within the cable;

FIGURE 2 is an exploded, isometric view of the device shown in FIGURE 1 showing the cable and armor wires removed;

FIGURE 3 is a side view of the section of cable shown in FIGURE 1 illustrating attachment of external equipment to the section;

FIGURE 4 is a longitudinal section of the device of our invention;

FIGURE 5 is a section taken at line 5—5 in FIGURE 4; and

FIGURE 6 is a cross-section taken at line 6—6 in FIGURE 4.

Referring more particularly to FIGURE 1 the reference number 10 designates a device constructed in accordance with our invention which is typically installed in an armored submarine cable 11, device 10 being a hollow and open-ended housing receiving conductors 12 of armored cable 11 through its interior while the armor wires 13 of cable 11 pass over the exterior of device 10. Since device 10 has an external transverse diameter somewhat larger than the diameter about which the armor wires 13 in cable 11 are laid, the portion of cable 11 on each side of device 10 incorporates additional fillers underlying wires 13 to taper armor wires 13 beneath jacket 14 of cable 11 such that they lay across device 10 without undue bending, as would not be the case if armor wires 13 were required to extend abruptly out and over device 10.

By reason, however, of the increasing diameter about which armor wires 13 are laid as they approach device 10 armor wires 13 tend to separate. To accommodate this device 10 is provided with four diametrically disposed pairs of bosses 15, 16, 17 and 18. Bosses 15 and bosses 17 are adjacent one end of device 10, and bosses 16 and bosses 18 adjacent the other end of device 10. Each boss 15 and 17 is associated with a boss 16 and 18, respectively, with which it is aligned with the same helical lay as armor wires 13 on the surface of device 10. The total circumferential space on device 10 subtended by the four bosses 15 and 17 and the similar space subtended by the four bosses 16 and 18 are equal to the circumferential increase in spacing of armor wires 13. Thus armor wires 13 pass over device 10 with normal lay between the bosses and are closely spaced to prevent undue movement and snagging of individual armor wires. As armor wires 13 pass over device 10 the jacket 14 of cable 11 is removed (actually in manufacture the jacket is omitted as armor wires 13 cross over device 10).

Referring more particularly to FIGURE 3 and also to FIGURES 2, 4, 5 and 6, which show enlarged views of device 10, it will be noted that the housing constituting device 10 basically includes a generally cylindrical casing 20 having a pair of generally cylindrical but smaller end sections 21 coaxially mounted at opposite ends of casing 20, and a hollow partition 22 extending diametrically across the interior of casing 20 and extending lengthwise within casing 20.

Casing 20, as can be seen more clearly in FIGURE 6, is formed of two identical halves divided lengthwise of casing 20 by rabbeted joints, each half having an interior flatted portion 20a normal to a radial line adjacent one rabbet such that as the pair of semi-cylindrical parts constituting casing 20 are placed together flats 20a are parallel. Exteriorly on each semi-cylindrical half of casing 20 there are located four bosses 15, 16, 17 and 18. Two such bosses designated 15 and 17 in FIGURES 4, 5 and 6 are located at one end of each half of casing 20 and are disposed 90° apart. The other two bosses 16 and 18 are located at the other end of each half of casing 20 and are disposed 90° apart. Thus in the assembled casing 20 the four bosses at each end of casing 20 are distributed at 90° intervals from each other.

It will be noted referring to FIGURES 1 and 6 in particular that while the circumferential widths of the bosses 15 and 16 are the same and the circumferential widths of bosses 17 and 18 are the same, such widths of bosses 15 and 16 differ from those of bosses 17 and 18. This difference in circumferential widths is dictated by design considerations and is not a functional difference. As was noted referring particularly to FIGURE 1, the bosses 15 and 17 at one end of casing 20 are paired off with bosses 16 and 18, respectively, at the other end of casing 20. Since the pairs are aligned along a long helical path corresponding to the lay of armor wires 13, the circumferential widths of each individual pair of aligned bosses are identical in order that the lay of armor wires 13 will not be disturbed, and as a result the circumferential spacing between groups of armor wires 13 determined by each such aligned pair of bosses is uniform along the length of casing 20.

It will be also noted, particularly with respect to FIGURE 1, that the lateral edges of the various bosses 15, 16, 17 and 18 are canted with respect to the axis of casing 20 to correspond to the lay of armor wires 13. It will be further noted, referring also to FIGURE 1, that the bosses 15 and 17 at one end of casing 20 (left end in FIGURES 1 and 2) are relatively shorter in the longitudinal direction of casing 20 than the bosses 16 and 18 at the opposite end of casing 20. This difference is again dictated by design considerations and has no functional effect.

Hollow partition 22, which like casing 20 is constructed of rigid material such as steel, is mounted within the interior of casing 20 extending transversely between the two flats 20a and through most of the length of casing 20. Basically partition 22, which is fabricated as an integral unit, includes two flat, parallel, rectangular side walls 22a. One pair of adjacent lateral edges of side wall 22a abut one flat 20a of casing 20 and the opposite pair of adjacent lateral edges of side walls 22a abut the opposite flat 20a of casing 20. The two opposite pairs of adjacent end edges of side walls 22a are joined by posts 22b which are part of the integrally fabricated unit forming partition 22 and which are located adjacent the ends of casing 20. Each post 22b is provided with a center bore which registers at its ends with diametrically opposite apertures extending through the wall of casing 20 at the location of the flatted portions 20a of casing 20. Thus each half of casing 20 and hollow partition 22 are secured together by cap screws 23 passing through such apertures and registering bores.

Each half of casing 20 is further provided with large apertures 20b of generally rectangular form which are located adjacent one end of casing 20 (left end in FIGURES 1, 3 and 4) and extend through the flatted portions 20a on the interior of casing 20 aligned between side walls 22a of partition 22. It will be noted referring particularly to FIGURE 1 that each aperture 20b is positioned with reference to a pair of associated bosses 15 and 16 such that its lateral marginal edges are entirely included within the confines of the helical path subtended on the surface of casing 20 between the opposite lateral edges of such pair of bosses 15 and 16. The lateral edges of apertures 20b extend parallel to the axis of casing 20 with the result that at each end of aperture 20b one of the lateral edges is spaced within the confines of such subtended helical path.

At one end of partition 22 (right end in FIGURES 4 and 5) the post 22b at that end is apertured, as indicated by the reference numeral 22c, adjacent one pair of lateral edges of side plates 22a forming an access opening adjacent the surface of one flat 20a into the interior of hollow partition 22 which is otherwise inaccessible, except through apertures 20b. The cap screw 23 extending through the post 22b which includes aperture 22c extends centrally through opening 22c. The portion of the cap screw 23 which is exposed in aperture 22c carries a collet 25 of soft resinous material, such as nylon or "Teflon."

End sections 21 at each end of casing 20 like casing 20 are constructed of rigid material and, as suggested above, are of smaller interior cross-section than casing 20. Actually the inside diameter of end sections 21 is selected such that the minimum cross-sectional area of end sections 21 approximates the cross-sectional area of the interior of casing 20 when the space occupied by hollow partition 22 is excluded. Each end section 21 consists of two generally semi-cylindrical halves and at one end is provided with an outwardly extending flange 21a which abuts the adjacent end face of casing 20. End sections 21 are thus secured to casing 20 by small cap screws 26 passing through flanges 21a into the ends of casing 20. Interiorly each end section 21 at its end adjacent casing 20 beneath flanges 21a tapers to a larger diameter approximating that of casing 20 as indicated by the reference number 21b.

The construction of device 10 is completed by snap-fit plastic caps 27 which cover apertures 20b.

In assembling a device, such as device 10, into a multi-conductor submarine cable 11, for providing external connection to one or more conductors of the cable, the cable is manufactured normally through to, but not including, the application of the armor wires 13.

At this point, the site for installation of device 10 is selected and the cable is opened in this area. The conductors 12a which are desired to be led to the instrument which later is to be attached to this area are selected and cut.

An electrical connector 28, which is suitably dimensioned to be received within the hollow partition 22 and which carries a water-tight cap 29, is attached to the ends of conductors 12a formed by the cut. The ends of conductors 12a selected are those which travel to the end of cable 11 which will eventually be connected to the receiving station. The remainder of conductors 12a running to the opposite end of cable 11 are left within cable 11 to act as fillers so that the diameter of cable 11 does not change.

Cap 29 is provided with a projection 29a containing a hole 29b. This projection and hole facilitate the later removal of connector 28 by allowing a hook-shaped tool to be engaged with hole 29b and to be used to pull the connector 28 from the partition 22 through aperture 20b.

At this point, partition 22 is positioned nestled between the various conductors 12 such that they are approximately divided equally on opposite sides of partition 22, and aperture 22c is headed in the direction from which conductors 12a which are terminated in connector 28 extend. The conductors designated by the reference numeral 12a are then placed through aperture 22c and extended into the interior of partition 22, falling free on one side of it. The partition 22 is further positioned along the cable 11 so that the free length of conductors 12a extending through aperture 22c is sufficient to permit the later removal of connector 28 the required distance from device 10. The free length of conductors 12a is then folded. The folded conductors 12a, and the connector 28 are then inserted between the walls 22a of partition 22, so that the connector 28 is adjacent the un-apertured end post 22b.

In the illustrated case, each of the conductors 12 is actually a quad including four separately insulated conductors. The quad 12a is separated at the point of entry through aperture 22c with two of the individually conductors positioned toward one side wall 22a as they extend through aperture 22c and with the other two positioned toward the other side wall 22a, providing a space between the two pairs of the quad in aperture 22c.

One half of casing 20 is then assembled with partition 22 so that the aperture 20b is in line with connector 28, and that flat 20a is adjacent the end of end post 22b not containing aperture 22c. Cap screws 23 are then inserted through the registering bores of casing 20 and partition 22. Collet 25 is installed over cap screw 23 in the space previously provided between conductor pairs of quad 12a in aperture 22c. Then the other half of casing 20 is assembled and the cap screws 23 are tightened. The end sections 21 are then assembled to casing 20 by utilizing cap screws 26. The dividing plane of each end section 21 should be oriented at a 90° angle to the dividing plane of casing 20. Plastic caps 27 are then installed in apertures 20b.

At this point, any other covering on cable 11 removed when the cable was opened is replaced up to the ends of end sections 21. A suitably long taper is then applied to cable 11 at each end of device 10 to increase the diameter of cable 11 to that of flange 21a. This can be done by winding on some sort of tape, or preferably, by applying a molded, split, tapered rubber sleeve, 30. It will be noted that towards the outer end, each end section 21 is provided with an annular exterior groove 21c. Suitable clamping devices or bindings are then used to depress the end of the tapes, or molded tapers, into grooves 21c to assure positive mechanical attachment to device 10.

The cable with device 10 installed is now ready to have the armor wires 13 installed. As armor wires 13 are laid and extend on the tapered portion of the rubber tapers 30 and other materials applied about conductors 12, armor wires 13 which normally are closely abutting gradually separate. This separation is arranged in groups such that the armor wires will fall between bosses 16 and 18, or 15 and 17, at the end of device 10 first approached. It will be noted that in the particular arrangement the dimensional considerations required by the design make it necessary to include bosses, such as 16 and 18, in order to provide tight packing of the armor wires in a single layer over the surface of casing 20. The armoring is continued placing the strands between the bosses, such as 15 and 17, at the other end of casing 20 such that apertures 20b are exposed between the spacing of the armor wires imposed by bosses 15 and 16. Thereafter if the jacket 14 is applied it is similarly brought up to the first end of device 10 overlying end section 21 at that end and secured as by tapes and then started again at the other end of device 10 overlying the end section 21 at that end to which it is similarly secured.

After the armoring of cable 11 has been completed, three steel strips 31, are placed around the cable and positioned adjacent the ends of bosses 15, 16, 17 and 18. The ends of the strips are fastened together, as by welding, to create rings encircling the device 10. One ring is then attached to the outer ends of bosses 15 and 17 by welding. The other two rings are similarly attached to each end of bosses 16 and 18. The outer surface of these rings preferably should not project above the surfaces of bosses 15, 16, 17 and 18. The function of bands 31 is to hold armor wires 13 in place, as, absent bands 31, wires 13 tend to ride up over bosses 15, 16, 17 and 18 when cable 11 containing device 10 passes over a sheave at high tension. Installation of device 10 in cable 11 is completed by applying duck tape 32 with 50% overlap about armor wires 13 on each side of device 10 for a short distance beyond rubber sleeve 30. Duck tape 32 is then covered by a serving 33 of jute nylon line. A band 34 of friction tape is preferably wrapped about device 10 overlying armor wires 13 and caps 27 to hold caps 27 in place.

The completed cable, since it provides no obstruction to handling even through including device 10, is thus laid as a unit. As device 10 pays off the sheave of the cable laying vessel, operation is stopped momentarily; friction tape band 34 and a cap 27 are removed; and connector 28 is retrieved. This is then connected to the desired external equipment which is indicated by the reference numeral M in FIGURE 3. It will be seen from the drawings (see particularly FIGURE 6) that the radial projection of each of bosses 15, 16, 17 and 18 is slightly greater than the diameter of armor wires 13. Thus the outer surfaces of the various bosses which are distributed about casing 20 provide surfaces about which a clamp can be positioned. Suitably clamps C can be tightened about device 10 over the bosses, and, by a bracket B connecting clamps C and equipmet M, equipment M is secured to cable 11.

We claim:

1. A device enabling external electrical connection with a conductor in an armored cable which includes:
   (a) a rigid, hollow, open-ended housing,
   (b) a lateral aperture in said housing positioned to communicate with the interior thereof,
   (c) a pair of bosses on the exterior of said housing, each said boss having a pair of lateral edges canted with respect to the central axis of said housing, and
   (d) said bosses being positioned on said housing with said aperture between them and with each of said lateral edges of one said boss in alignment with the corresponding lateral edge of the other said boss along a line describing a helix about said axis, whereby said bosses subtend a space on the exterior of said housing into which said aperture opens.

2. In combination:
   (a) an armored cable including
   (b) a conductor, and
   (c) a plurality of armor wires laid thereabout; and
   (d) a device according to claim 1, in which
   (e) said conductor extends through one end of said housing and said lateral aperture,
   (f) the alignment of said corresponding lateral edges of said bosses corresponds to the lay of said armor wires, and
   (g) said armor wires are laid about said housing spaced by said bosses thereby exposing said aperture.

3. A device enabling external electrical connection with a conductor in an armored cable which includes:
   (a) a rigid, hollow, open-ended housing,
   (b) a portion of the hollow interior of such housing having a cross-section larger than that of said open ends,
   (c) a hollow partition disposed in said portion of the interior of said housing extending thereacross and lengthwise in said portion of said housing,
   (d) a lateral aperture in said housing positioned to communicate with the interior of said hollow partition, and (e) a pair of bosses on the exterior of said housing aligned with said aperture between them.

4. The combination according to claim 2 in which:

(a) the outward projection of said bosses is greater than the diameter of said armor wires, and which further includes, (b) bands encircling said armor wires attached to said bosses.

References Cited in the file of this patent
UNITED STATES PATENTS

| | | |
|---|---|---|
| 702,362 | Emmons | June 10, 1902 |
| 1,011,118 | Carolan | Dec. 5, 1911 |
| 1,999,045 | Goetz | Apr. 23, 1935 |